April 22, 1930. R. A. MIRZAN 1,755,264
MEANS FOR ANCHORING BOLTS
Filed Feb. 25, 1929
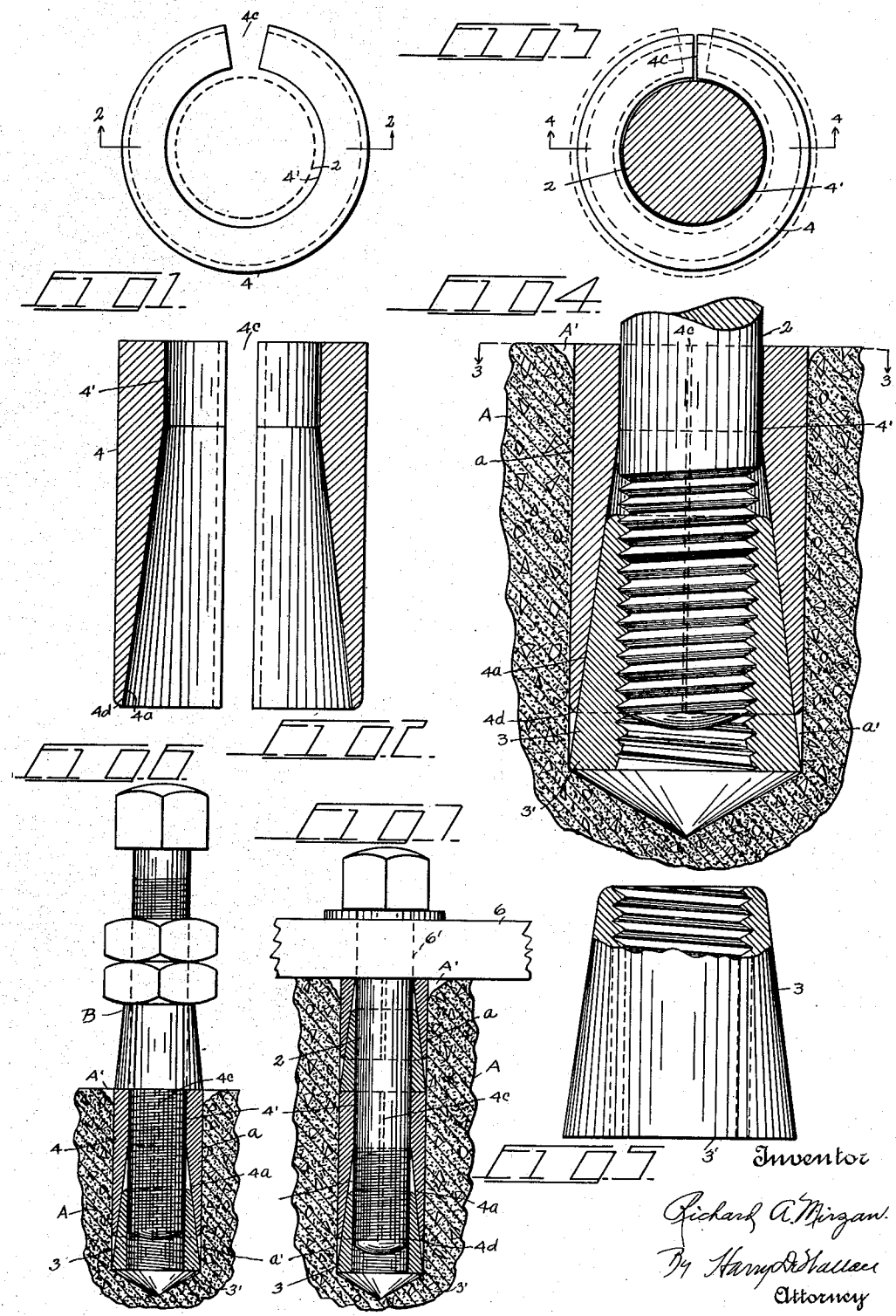

Patented Apr. 22, 1930

1,755,264

UNITED STATES PATENT OFFICE

RICHARD A. MIRZAN, OF SYRACUSE, NEW YORK, ASSIGNOR TO AMERICAN BOLT ANCHOR CORPORATION, OF SYRACUSE, NEW YORK, A CORPORATION OF NEW YORK

MEANS FOR ANCHORING BOLTS

Application filed February 25, 1929. Serial No. 342,514.

This invention relates to improvements in bolt anchors, designed especially for use in connection with bolts and rods of any diameter and length, and has for its particular object to provide a novel, simple and extremely powerful anchoring unit, comprising two hard metal members or parts, which may be inserted in holes drilled or otherwise formed in stone, concrete or brick masonry. A further object is to provide a simple anchoring unit wherein the primary member comprises a threaded cone that functions like a nut, said cone preferably being disposed at the bottom of a prepared hole, the base of the cone having substantially the same diameter as the hole; the secondary member of said unit comprising a cylinder or bushing-like part, whose normal diameter corresponds to the diameter of the opening in the masonry, the said member being formed with a cylindro-conical bore, the latter portion telescoping with and having a taper that conforms exactly to the taper of the cone, while the plain cylindrical portion of the bore conforms to the body of the bolt. The cylinder after being machined is preferably slitted from end to end and then expanded throughout its length to a greater diameter than the hole in the masonry, which renders it necessary to drive the cylinder into the hole in order to install the anchor. By this arrangement, a close and substantially true fit may be ensured, in case the holes are not of uniform diameter. This forcible insertion contracts the cylinder and causes the latter to make complete contact circumferentially and longitudinally with, and at the same time exert considerable pressure radially against, the walls of the hole, which materially increases the resistance to the axial movement of the cone, when the bolt is subjected to linear stresses; the said driving operation preferably continuing until complete contact is also effected between the conical surfaces of the cylinder and cone, and when thus installed, the anchor functions in virtue of the differential friction between metal and metal on the one hand, and between metal and stone on the other hand. When the secondary member of the unit is finally adjusted, the plain or straight bore above the cone becomes so contracted as to prevent appreciable lateral movement or sway of the bolt, due to strains resulting from excessive vibrations or shocks. And a further object is to so construct and arrange the primary and secondary anchoring members that two or more units may be compounded in a novel manner, for increasing the load capacity, as well as the factor of safety, especially in cases where deeper than ordinary anchorage is afforded or desired.

A full and clear understanding of the invention may be had from the detailed description which follows, and by reference to the accompanying drawings, in which—

Figure 1 is a top-end view of the slit bushing or cylinder, the same being expanded. Fig. 2 is a central longitudinal section, taken on line 2—2 of Fig. 1. Fig. 3 is a top plan view of the simple anchor, showing the bushing in relation to the bolt, the latter being in horizontal section. Fig. 4 is a central longitudinal section, taken on line 4—4 of Fig. 3. Fig. 5 is a broken elevational view of the conical nut—the primary anchoring member. Fig. 6 is a central longitudinal section, showing the tool employed for driving the bushing and cone into a hole formed in concrete. Fig. 7 is a similar sectional view, showing a piece of work held in place by a bolt and a compound arrangement of anchoring units.

In the drawings, referring particularly to Figs. 1 to 5 inclusive, that feature only the simple form of the anchor, 2 represents an ordinary threaded rod or bolt, which is shown anchored in a bed or block of concrete A, the latter being formed with a drilled or otherwise prepared socket $a$. This simple anchor comprises two complementary parts, as primary member 3, upon which is imposed secondary member 4, both of said members preferably consisting of steel or other hard metal. Member 3 comprises a hollow frustum of a cone, which is threaded interiorly to receive the bolt 2. The base 3' of this cone preferably rests firmly upon the bottom of the socket $a$, the diameter of the base being substantially the same as that of the hole.

Member 4 comprises a plain cylinder or tube, having substantially the same diameter, in the first instance, as the hole $a$. The top-end portion of member 4 is preferably formed with a plain concentric bore 4', while its bottom end portion is formed with a conical bore $4^a$, that intersects the bore 4', and whose taper preferably conforms exactly to the taper of the cone 3. The member 4 is next slitted from end to end, as at $4^c$, and then expanded to a diameter greater than that of the socket $a$, as shown in Figs. 1, 2 and 3. The purpose of this slitting and expanding of member 4 is to ensure relatively close and true fitting, when said member is afterwards driven into the socket $a$. Practically all holes drilled in stone or concrete are formed with slightly flaring mouths, as A', which facilitates the entrance of the expanded cylinders 4, whose bottom ends are rounded or beveled, as at $4^d$, to lessen the resistance when the cylinders are forcibly inserted in the concrete. In practice, parts 3 and 4 may be assembled on a tool, as B, shown in Fig. 6 in proper relative position and driven in together until the cone touches the bottom, the tool then being turned with a wrench, so as to cause the parts to be firmly telescoped. The tool B may then be removed and the bolt 2 applied, as shown in Figs. 4 and 7. This driving operation tends to so contract the member 4, as to substantially close the kerf or slit $4^c$, and reduces the plain bore 4' to substantially the diameter of the body of the bolt 2, as shown in Figs. 3, 4 and 6, and prevents lateral movement or sway of the bolt, as explained. The forcible insertion of the expanded member 4 creates relatively great pressure radially against the circular walls of the hole $a$, which tends to resist longitudinal or axial movement of said cylinder when tensile force is applied to the bolt and member 3, and accordingly renders the anchor much more effective than would be the case if the member 4 were not slitted and expanded. In practice, the slant height of member 3 is preferably considerable less than the corresponding dimension of the tapered bore of member 4, and the lower end $4^d$ of member 4 is preferably formed blunt, to reinforce said end, but more particularly to step the members relatively to each other, by providing a clear annular space, as $a'$, which facilitates adjustment of the members, and also serves to collect dust and other products of abrasion due to the forcible insertion of member 4.

The foregoing, describes the novel method of constructing and applying the simple anchor comprising the members 3 and 4, to stone or concrete masonry, for anchoring a machine or other work, as 6, which may be mounted directly upon the concrete A, according to Fig. 7, wherein the work 6 is shown formed with a perforation 6' through which the bolt 2 is inserted and afterwards screwed into the cone 3. This simple from of anchor is commonly used in connection with loads that are relatively light and where the anchorage is of relatively shallow depth. Where heavier machinery or work is to be made fast, more powerful anchoring means or a greater factor of safety may be provided, in a simple manner, by applying the complementary members 3 and 4, without change, to a deeper hole, and by correspondingly lengthening the bolt 2, without enlarging its caliber, as shown in Fig. 6.

Obviously in cases where deeper anchorage is required or desired, two or more units may be employed, which involves mere duplication of the units, the latter being placed one on top of the other.

Having thus described my invention, what I claim, is—

An anchoring unit for securing a screw-threaded bolt to masonry formed with a socket having its bottom end closed to support said unit including in combination, a hollow frustro-conical member inserted in said socket and internally threaded throughout its length to receive said bolt, said member having its base portion formed to seat against a part of the bottom of the socket and being of substantially the same diameter as the socket, and an inherently expansive sleeve having a wall unbroken except by a single longitudinal slot extending throughout its length, said sleeve being formed with an internally tapered portion complementary to the frustro-conical member and terminating a substantial distance below the upper end of said sleeve, the lower end of the sleeve terminating spaced from the lower end of the frusto-conical member, said sleeve being initially of larger diameter than the socket whereby the same is inherently expanded into engagement with the walls of the socket and forcibly expanded into engagement with the latter upon engagement of the sleeve with the frustro-conical member to provide an anchor for said bolt.

In testimony whereof I affix my signature.

RICHARD A. MIRZAN.